J. G. Hadfield,
Depurator.
No. 4,080, Reissued July 26. 1870.
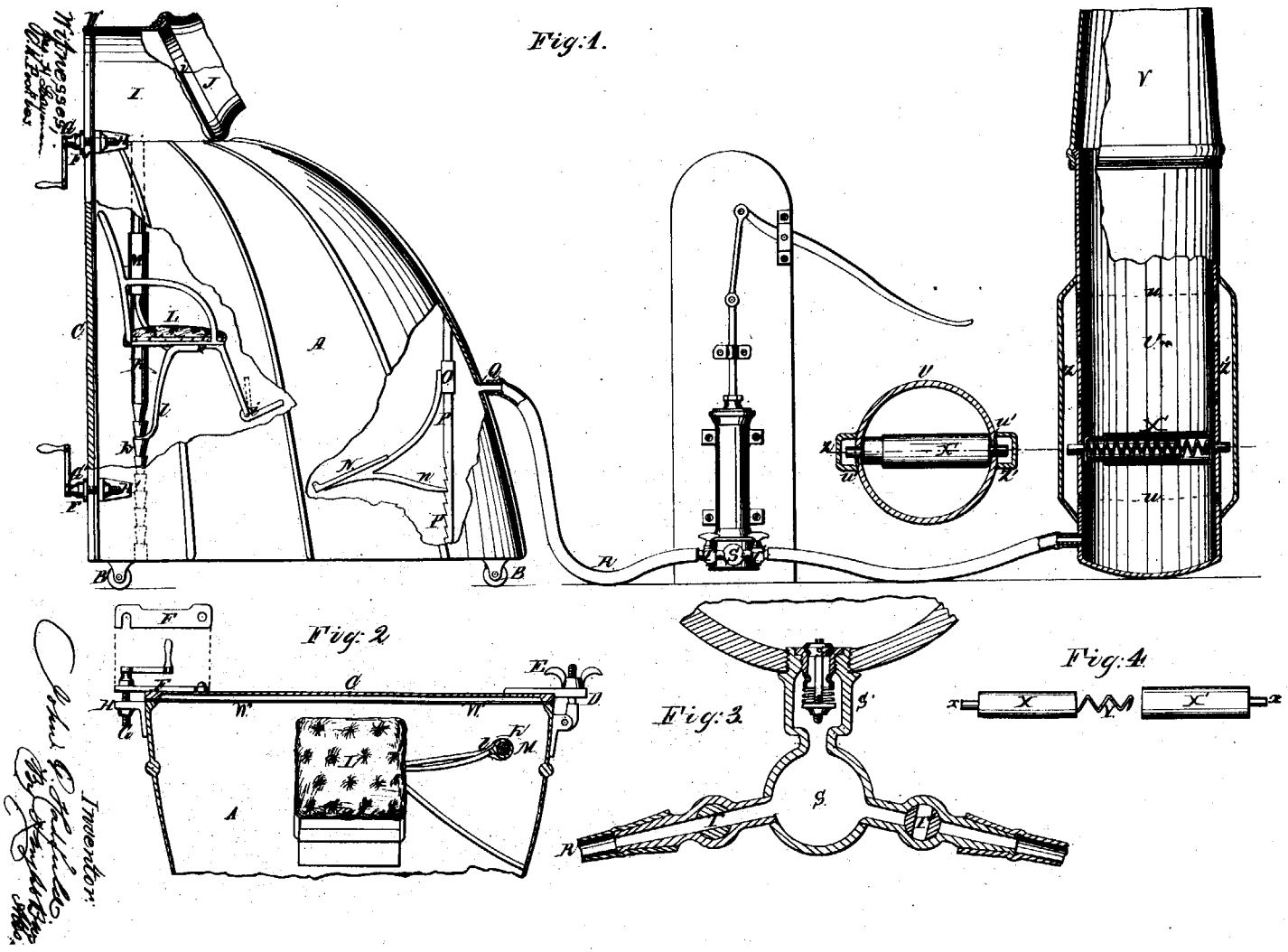
N. PETERS, PHOTO-LITHOGRAPHER, WASHINGTON, D. C.

United States Patent Office.

JOHN G. HADFIELD, OF CINCINNATI, OHIO.

*Letters Patent No.* 72,631, *dated December* 24, 1867; *reissue No.* 4,080, *dated July* 26, 1870.

IMPROVEMENT IN MEDICAL VACUUM APPARATUS.

The Schedule referred to in these Letters Patent and making part of the same.

I, JOHN G. HADFIELD, M. D., of Cincinnati, Hamilton county, Ohio, have invented new and useful Improvements in Medical Vacuum Apparatus, of which the following is a specification.

*Nature and Objects of the Invention.*

My invention consists in improvements in apparatus employed to relieve a part or all of the human body of atmospheric pressure, for medical or curative purposes.

*General Description with Reference to the Drawing.*

Figure 1 is a partly-sectionized side elevation of vacuum-chambers, designed for the entire body and a limb respectively, both being operated by a single exhaust-pump.

Figure 2 is a horizontal section through the rear portion of the body-chamber.

Figure 3 is a horizontal section, showing the lower pump-valve and two couplings for separate chambers.

Figure 4 is a detached view of the hand-rest of the limb-chamber.

A represents a box or receptacle adapted to receive the entire person in a sitting posture, the same being an irregular semi-conoidal box, preferably mounted on casters B, and capable of being thrown entirely or partially open at the back by opening a door, C.

This door is, on one side, connected to the box by two hinges, of which one, D, is shown, a thumb-screw, E, on each hinge, enabling the door to be adjusted toward or from the box, so as to secure a proper air-tight fit.

The side of the door opposite to the hinges is provided with two hooks, F F′, engaging over two bolts, G G′, which, being screwed, more or less, into lugs H H′ on the box, bring the door tightly against the latter.

The box A is surmounted by an elevated portion or neck, I, whose oblique opening, *i*, for the face of the patient, has a lip or sleeve, J, of India rubber, secured to said opening by being passed over a flanged margin, *j*.

The corner of the box nearest the hinges has a round post, K, having, near its lower portion, a succession of steps or notches, *k*, for the reception of a foot, *l*, of a chair, L, having a sleeve, M, which incloses the upper portion of the post, upon which it is capable of sliding.

The foot *l*, being placed higher or lower on the steps *k*, supports the chair at a greater or less elevation, to accommodate the patient. The chair may be swung in a horizontal plane about the post as a center, for the purpose presently explained. The chair may have a hinged foot-rest, *l′*, for children.

For the use of adults, I provide a foot-rest, N, which has a sleeve, O, to inclose and slide upon a foot, *n*, to be supported on either one of a series of steps. *p*, on a post, P, affixed within the box near its front portion.

Q is a nozzle, which enters the box at any convenient part, and receives a flexible tube, R, from the exhaust.

The tube R, instead of being connected directly with the pump, as heretofore, enters a manifold, S, through one of a series of faucets, T T′, each of which may have its proper tube connected with a separate vacuum-chamber.

One such chamber is shown at U, being a hollow cylinder, provided with a flexible lip or sleeve, V, a series of opposite orifices, *u u′*, to receive the pivots *x x′* of a hollow hand-rest, composed of two tubes, X X′, sliding one within the other, and held in their extended position by means of a spiral spring, Y.

The orifices *u u′* are covered by sheaths Z Z′, to prevent leakage.

The manifold S contains a valve-chamber, S′, having a valve, *s*, opening outward or toward the pump, and which forms, in effect, the induction-valve of the pump.

This valve is readily accessible by simply unscrewing the manifold S. This arrangement is more convenient than where the induction-valve is within the pump.

The back edge of the receptacle has a gasket, W, of India rubber, to enable the door to be closed air-tight against it. The screws G G′ enable the setting up or adjusting of the door, to preserve an equal bearing of every part of it against the box.

*Operation.*

The operation is as follows:

For body treatment, the chair and foot-rest L N are respectively adjusted to the proper heights, and the former being swung outside of the receptacle, the patient takes his seat thereon, and is swung around within the receptacle until the chair assumes the position seen in fig. 1.

The patient then places his face so as to occupy the sleeve J, and the door being shut, is secured by means of the hooks F F′ and screws G G′, and the air exhausted in the usual way.

The adjustable devices D E F F′ G G′ H H′ enable the instrument to be used with a great variety of patients. By removing the hand-rest X X′ *x* Y entirely, the receptacle U may be used for the leg. A cushion may be inserted in the bottom of the said receptacle instead of the rest aforesaid.

When compared with previous devices, the herein-described construction of a vacuum-chamber is believed to afford several entirely new and very useful advantages.

For example, my receiver, by enabling the inclosure of all parts of the person, leaving only the breathing organs exposed, enables its useful action to be extended, when desired, to the head of the patient equally with the rest of the body, and frees it from any injurious tendency to crush the head and vertebral column down, and crowd the viscera upon each other. It is also free from any tendency to draw the circulation from the head.

*Claims.*

I claim herein as new and of my invention—

1. A medical vacuum-chamber made in two or more parts, with elastic packing, combined with one or more hinges, and suitable fastenings that allow pressure to be applied on both sides of the door or other hinged part.

2. The medical vacuum-chamber A, having the elevated neck I, with face-opening *i*, and an open rear, closed by the door C and the fastening devices, as set forth.

3. The chair L, capable of being swung out or into the case, in the manner and for the purpose set forth.

4. Such a chair, when adjustable in height upon its axis, substantially as set forth.

5. The parts D E F F′ G G′ H H′, or their equivalents, by which the door is made to bear with an equal and air-tight pressure at every part.

6. In the described combination, the adjustable foot-rest N and notched post P, as set forth.

7. The limb-receptacles U *u*, when combined with the adjustable hand-rest X X′ *x* Y.

In testimony of which invention I hereunto set my hand.

JOHN G. HADFIELD, M. D.

Witnesses:
GEO. H. KNIGHT,
WILLIAM BAUER.